US005533843A

United States Patent [19]

Chung

[11] Patent Number: 5,533,843

[45] Date of Patent: Jul. 9, 1996

[54] ELECTRIC HAND DRILL SET

[76] Inventor: Lee H.-C. Chung, No. 21-8 Shang-Tso-Wu, Chung-Li City, Taoyuan Hsien, Taiwan

[21] Appl. No.: 305,988

[22] Filed: Sep. 19, 1994

[51] Int. Cl.$^6$ .............................. B23B 45/02; A45C 11/26

[52] U.S. Cl. .................. 408/241 R; 206/349; 206/459.1

[58] Field of Search ........................ 408/241 R; 206/207, 206/223, 234, 320, 349, 351, 459.1, 459.5, 576; 320/48

[56] References Cited

U.S. PATENT DOCUMENTS

| | | | |
|---|---|---|---|
| 3,783,364 | 1/1974 | Gallanis et al. | 320/48 |
| 4,703,852 | 11/1987 | Verdier | 206/349 |
| 4,917,239 | 4/1990 | Smith | 206/349 |

*Primary Examiner*—Steven C. Bishop
*Attorney, Agent, or Firm*—Steven M. Rabin

[57] ABSTRACT

An electric hand drill set includes a case constituted by a casing closeable by a cover to define therein a first interior space and a second interior space. A hand drill is received and removably held within the first interior space. A power converting and supplying device, such as an adaptor, is received and removably held within the second interior space. The power converting and supplying device has an extension cord adapted to connect to an external power source. The hand drill has and is powered by a rechargeable battery set which is electrically connectable to and thus chargeable by the power converting and supplying device. The charging of the battery set is indicated by a charging indicator. The cover has a window formed thereon, opposing the charging indicator to allow user to monitor the charging of the battery set.

17 Claims, 7 Drawing Sheets

ELECTRIC HAND DRILL SET

FIELD OF THE INVENTION

The present invention relates generally to electrical hand drills and in particular to an electrical hand drill set which includes a hand drill and an adaptor encased in a case.

BACKGROUND OF THE INVENTION

Electrical hand drills are well known and useful tools for many different applications and fields. The most traditional electric hand drills have a pistol-like configuration and are powered by electricity supplied by a cord when connection with an external power source, such as a wall outlet. The cord which connects the hand drill to the wall outlet often interferes with the operation of the hand drill. Further, such a hand drill requires an external power source and thus it cannot be used in an environment where an external power source is not available.

Some of the later developed hand drills are equipped with a built-in power source, such as a rechargeable battery set. The charging of the rechargeable battery set requires an adaptor which converts the alternate current, usually of higher voltage, that is available from the wall outlet into direct current of a lower voltage. Conventionally, the battery set and the adaptor are separate parts and they are also not integral parts of the hand drill. Further, the hand drill is usually stored in a case, while the battery set and/or the adaptor which are not integral parts of the hand drill, are usually not included in the case in the conventional device. Thus, an obvious problem of this design is that the rechargeable battery and/or the adaptor may get lost and this causes inconvenience.

It is therefore desirable to provide an electric hand drill set which comprises a case inside of which an electrical hand drill having a rechargeable battery set mounted thereto and an adaptor are both removably disposed so as to overcome the prior art problems.

SUMMARY OF THE INVENTION

An object of the present invention is to provide an electric hand drill set which comprises a case inside of which a hand drill and an adaptor for connecting to an external power source to supply electricity to the drill are both removably disposed so as to overcome the deficiency of the prior art.

In accordance with the present invention, there is provided an electrical hand drill set comprising a case constituted by a casing closeable by a cover to define therein a first interior space and a second interior space. A hand drill is received and removably held within the first interior space. A power converting and supplying device, such as an adaptor, is received and removably held within the second interior space. The power converting and supplying device has an extension cord adapted to connect to an external power source. The hand drill has and is powered by a rechargeable battery set which is electrically connectable to and thus chargeable by the power converting and supplying device. The charging of the battery set is indicated by a charging indicator. The cover has a window formed thereon, opposing the charging indicator to allow a user to monitor the charging of the battery set.

BRIEF DESCRIPTION OF THE DRAWINGS

The present invention will be better understood from the following description of preferred embodiments of the present invention, with reference to the attached drawings, wherein.

DETAILED DESCRIPTION OF THE PREFERRED EMBODIMENT

With reference to the drawings and in particular to FIGS. 1–4, wherein a first embodiment of an electric hand drill set constructed in accordance with the present invention is shown, the present electric hand drill set comprises a case 1, a hand drill assembly 3 and a power supplying and converting device, such as an adaptor 4 shown in FIGS. 1–4.

Figure 1:
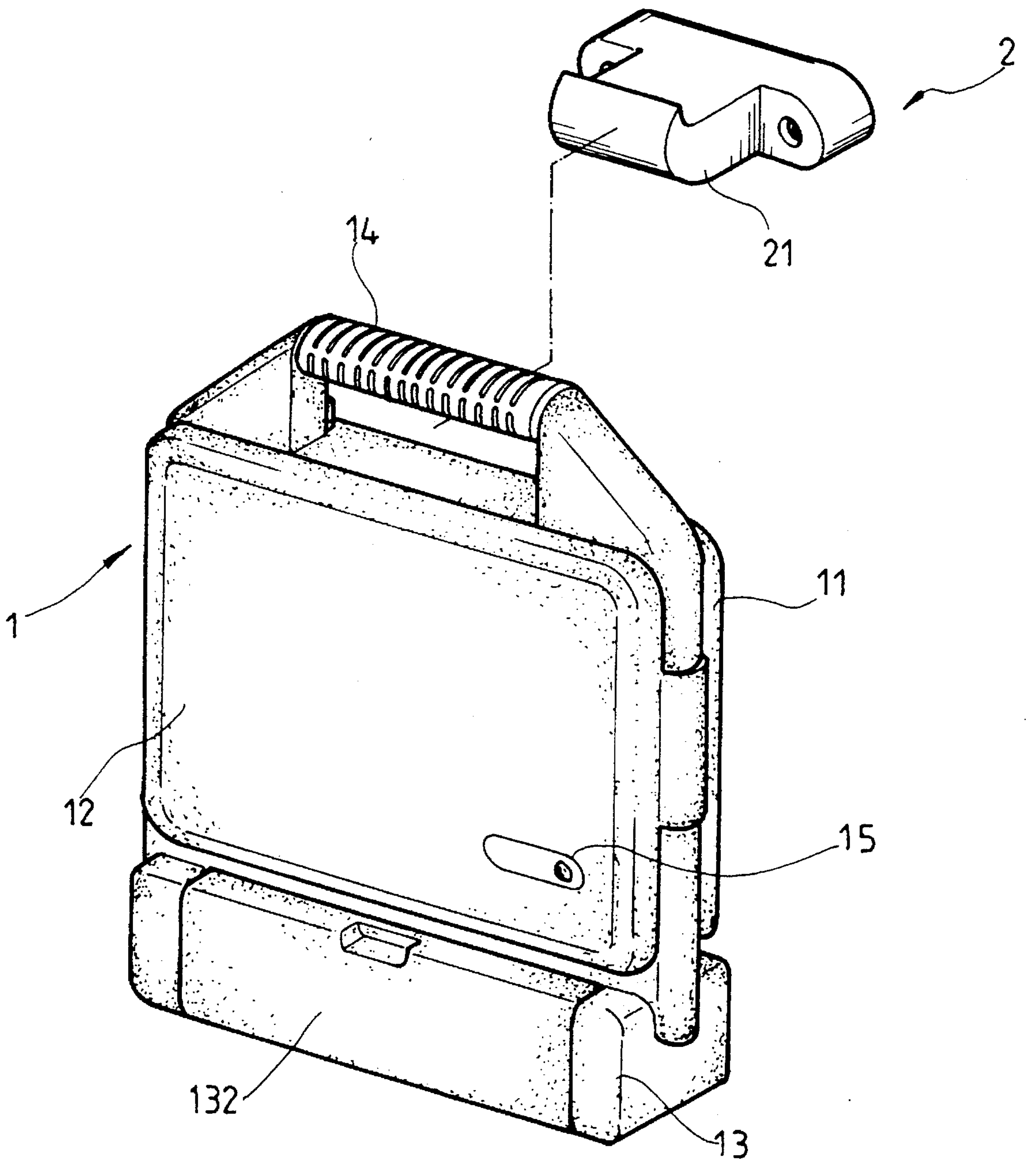
FIG. 1 is a perspective view showing an electric hand drill set constructed in accordance with the present invention, with the case closed.
Figure 2:
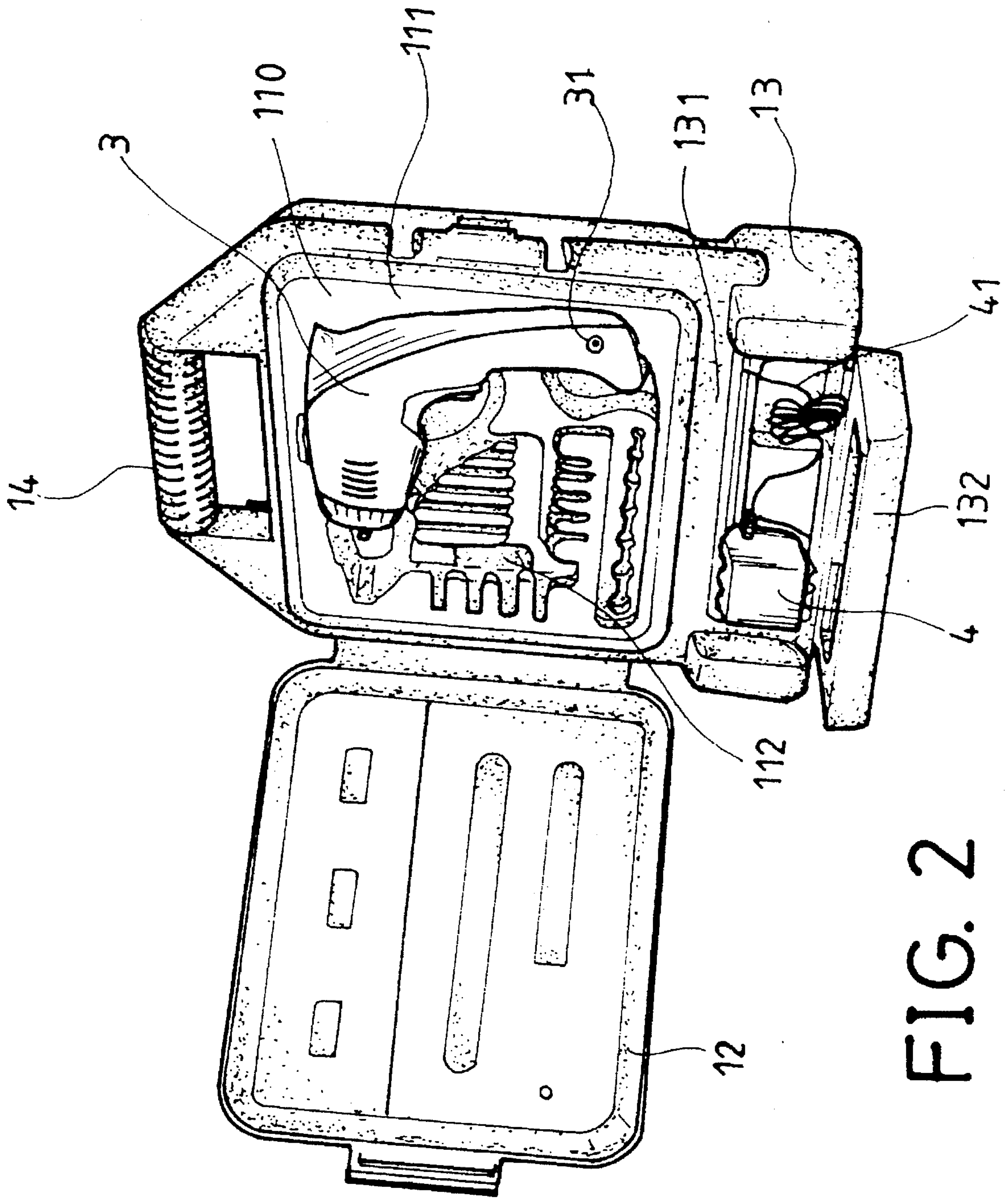
FIG. 2 is a perspective view showing the electric hand drill set in accordance with the present invention with the case opened to show the hand drill that is retained within the case.
Figure 3:
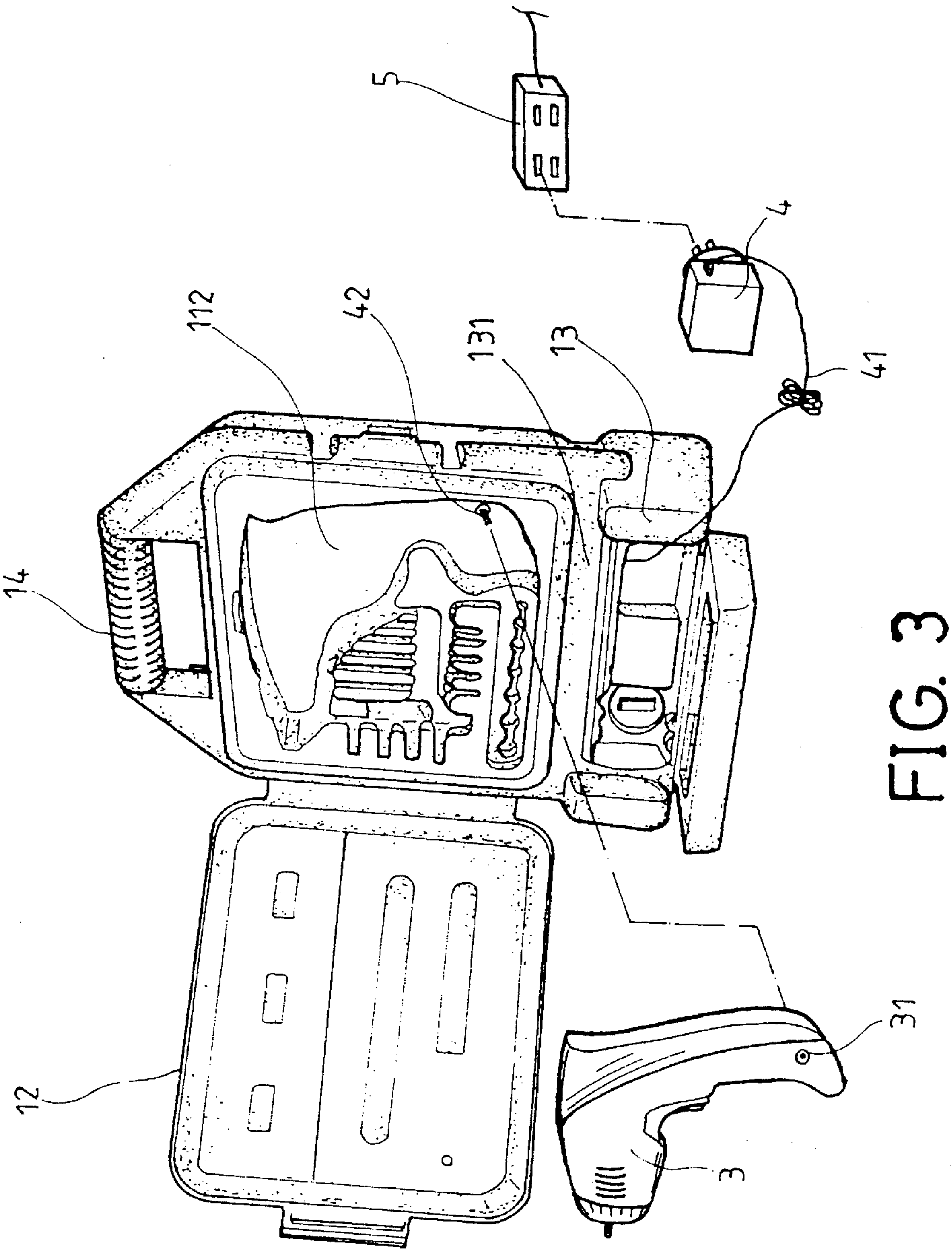
FIG. 3 is a perspective view showing the electric hand drill set in accordance with the present invention with the case opened and the hand drill and the adaptor removed out of the case.
Figure 4:
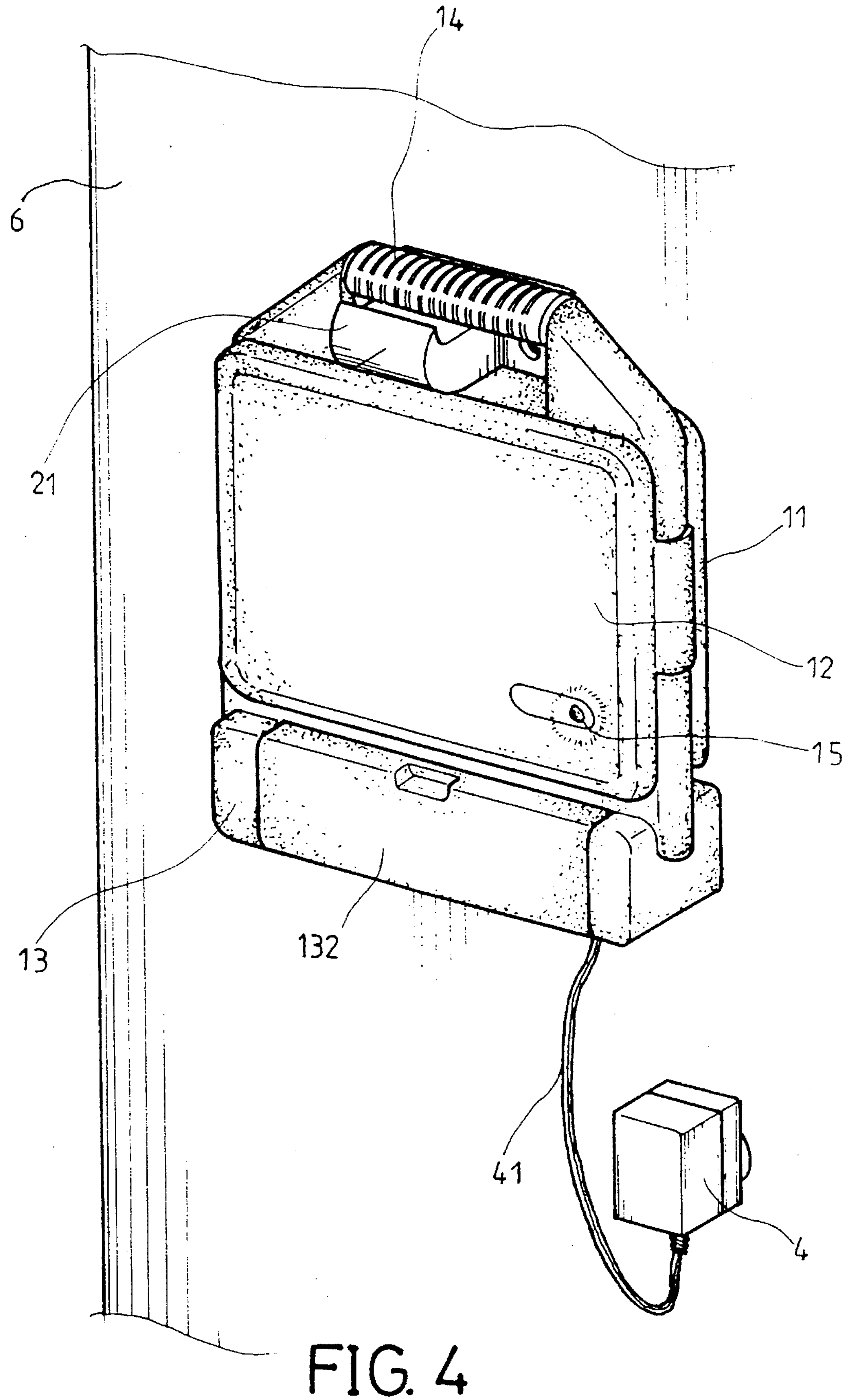
FIG. 4 is a perspective view showing the electric hand drill case hung on a fixture surface by means of a hanger.

The case 1 comprises a casing 11 on which a cover 12 is pivoted to define therein a first interior space 111 and a second interior space 13. The case 1 also has a handle 14 formed thereon which is adapted to be held and carried by a user or hung on a hanger 2 fixed on a fixture surface 6 (FIG. 4). As shown in FIGS. 1 and 4, the hanger 2 comprises an upward extension 21 serving to hold the handle 14 on the hanger 2.

The first interior space 111 of the case 1 receives a hand drill holder 110 therein. The holder 110 defines thereon a recess 112 having a first section substantially corresponding in shape and size to the hand drill 3 to receive and removably hold the hand drill 3 therein. The holder 110 is preferably made of a material that is resilient and is capable to impose a sufficient friction on the hand drill 3 so as to securely hold the hand drill 3 therein. The recess 112 also comprises a second section which includes a plurality of straight grooves for receiving therein drill tips and a number of spot-like pits to receive and hold therein sockets.

The second interior space 13 comprises a recess for removably holding therein the adaptor 4 which has a wire or extension cord 41 leading to a connector 42 mounted within the first interior space 111 and located to be connectable by a charge socket (not shown) formed on the hand drill 3. The hand drill 3 may comprises a rechargeable battery set (not shown in FIGS. 1–4) built therein to power the hand drill 3 and in electrical connection with the charge socket. The adaptor 4 is removable out of the case 1 to connect to an external power source 5 to supply electricity suitable to recharge the battery set to the hand drill 3 via the extension cord 41. Preferably and as shown in FIGS. 1–4, the second interior space 13 is separated from the first interior space 111 by a partition 131 and is closable by means of a secondary cover member 132 which is separate from the primary cover 12 which closes the first interior space 111 so that the hand drill 3 can be recharged without opening the primary cover 12 or removing the hand drill 3 out of the case 1.

The hand drill 3 is preferably provided with a charging indicator 31 which may emit light when the battery set is being charged. The primary cover 12 is provided with a window 15 opposing the charging indicator 31 when the hand drill 3 is disposed within the recess 112 and the primary cover 12 is closed. This allows a user to monitor the charging of the battery set without opening the primary cover 12.

Figure 5:
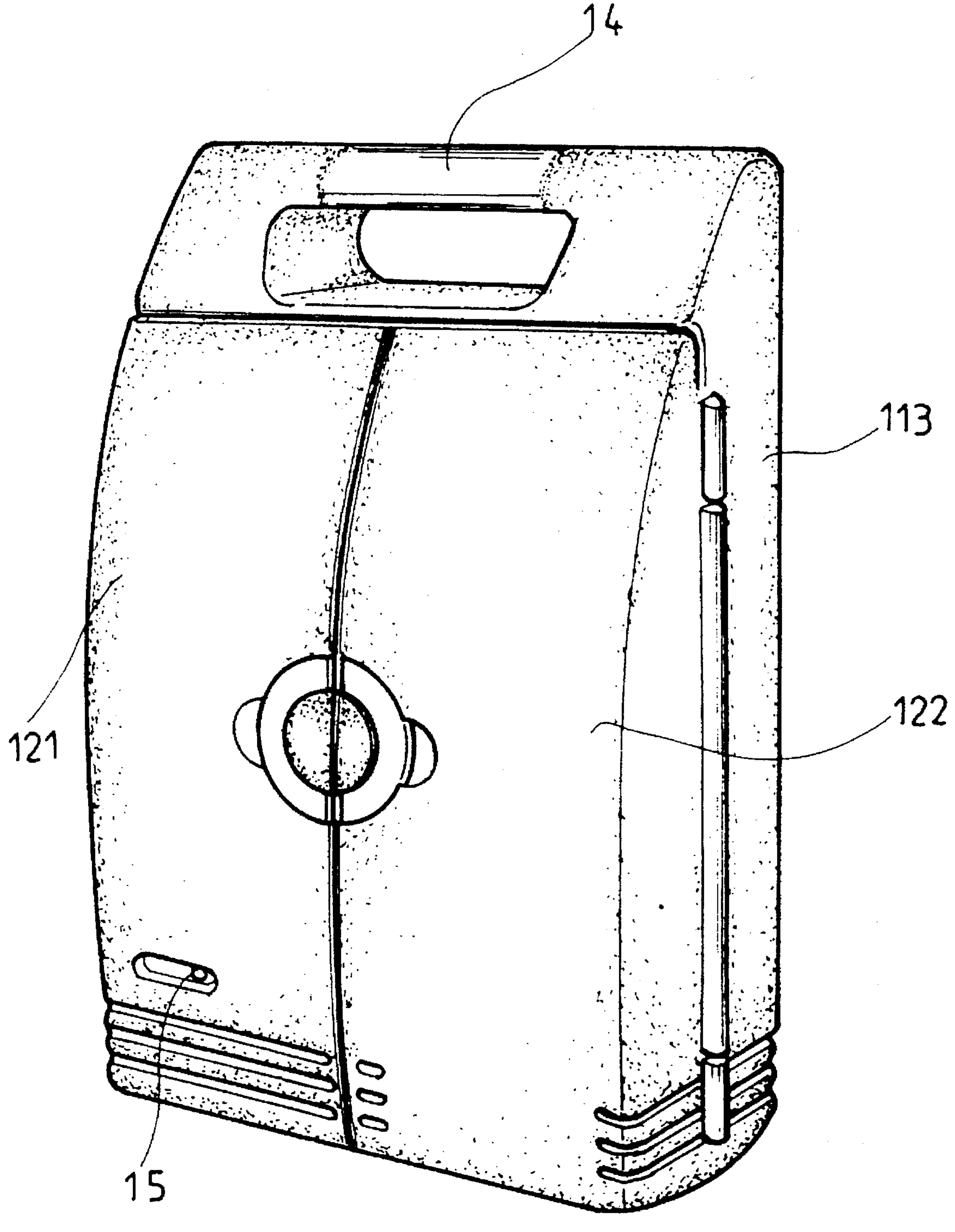
FIG. 5 is a perspective view showing a second embodiment of the electric hand drill set constructed in accordance with the present invention with the case closed.
Figure 6:
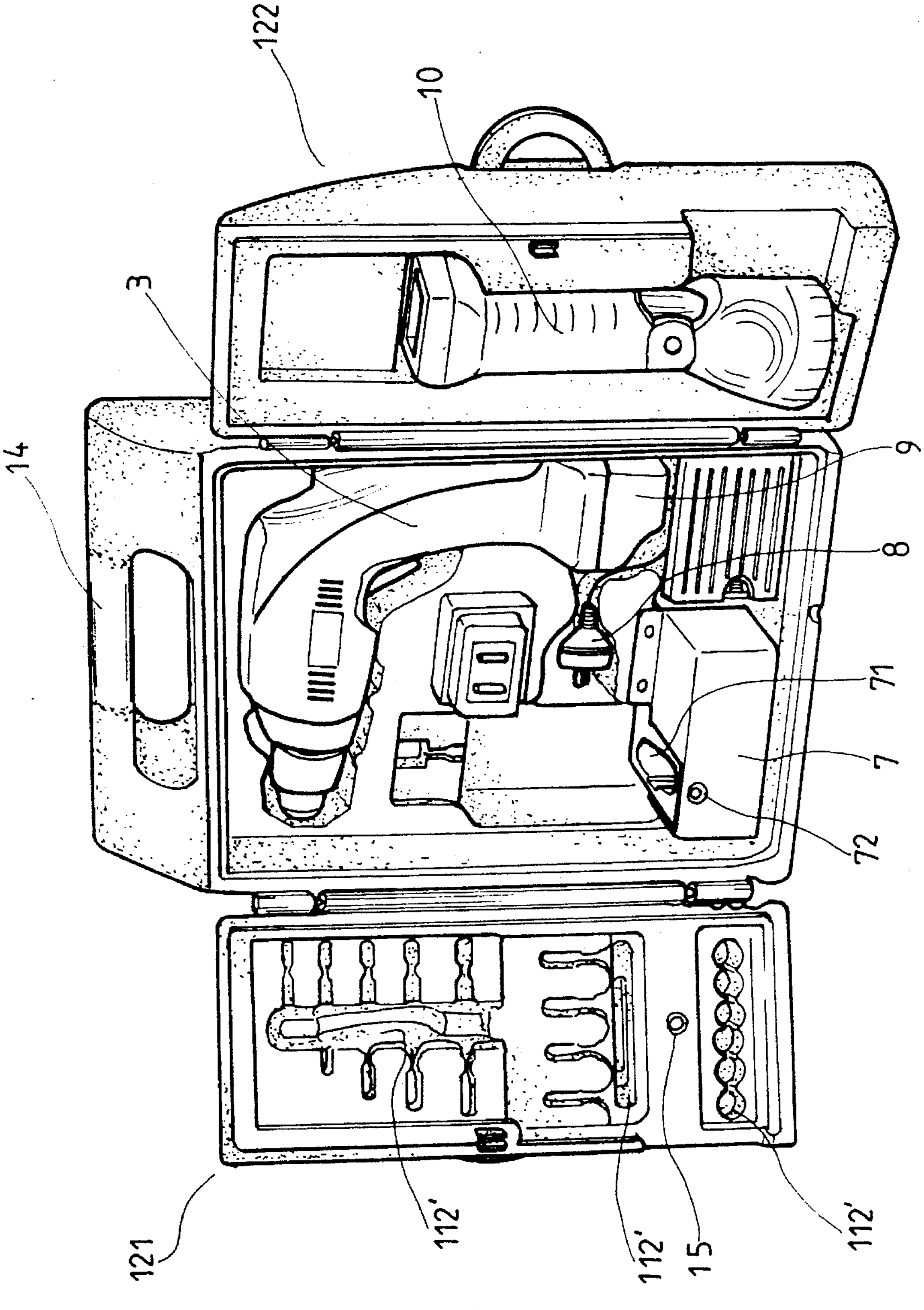
FIG. 6 is a perspective view showing the second embodiment of the present invention with the case opened to show the electric hand drill retained within the case.
Figure 7:
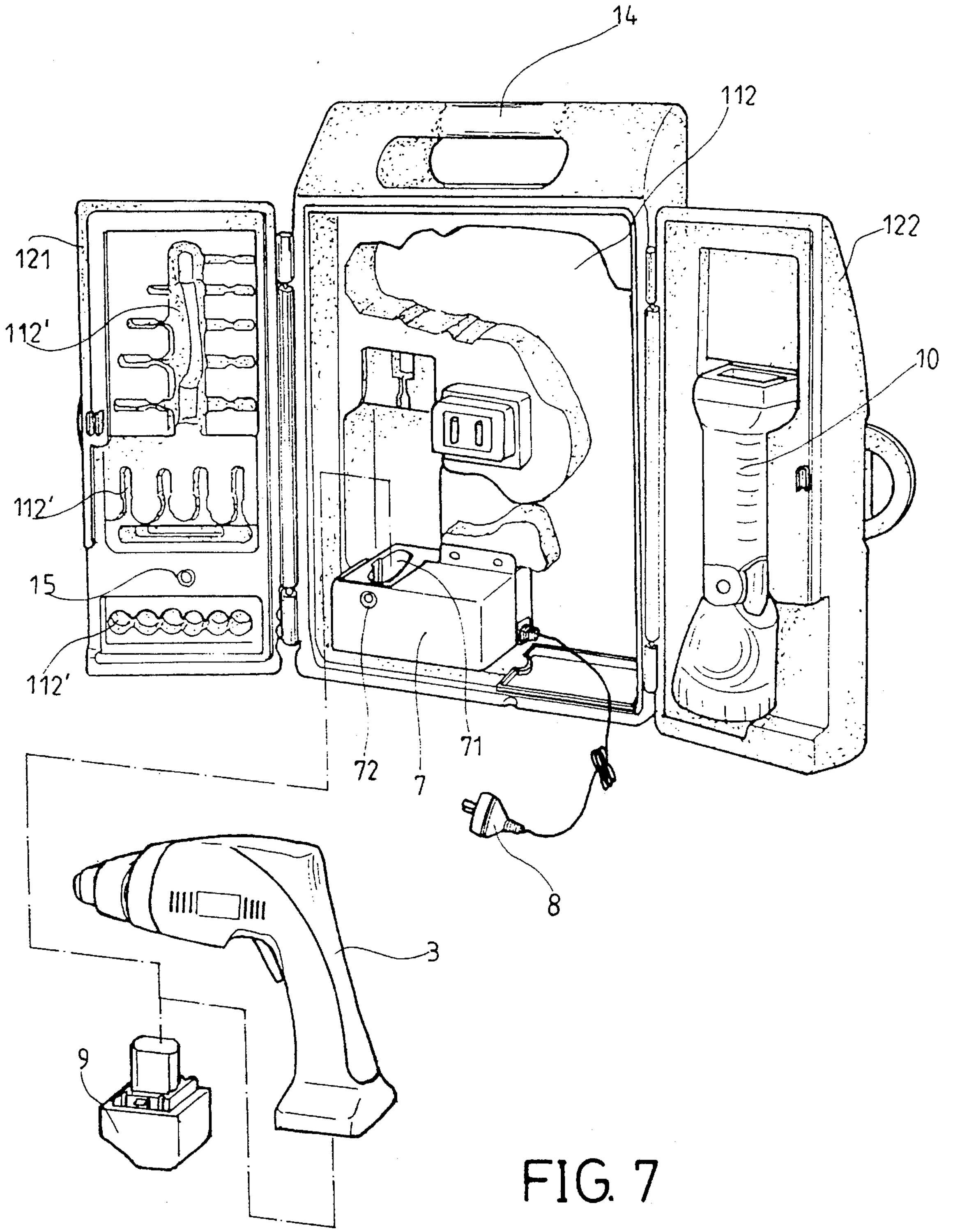
FIG. 7 is a perspective view showing the second embodiment of the present invention with the case opened and the electrical hand drill removed out of the case.

In FIGS. 5–7, a second embodiment of the electric hand drill set constructed in accordance with the present invention is shown. In the second embodiment of the present invention, the hand drill 3 comprises a separate rechargeable battery set 9 which is not built in the hand drill 3. In the second embodiment, the first interior space 111 and the second interior space 13 of the first embodiment are no longer separated by a partition and the secondary cover member 132 is eliminated. However, the primary cover 12 which is illustrated as a single member is now replaced by two members 121 and 122 which are pivoted to the casing 11 at opposite direction.

A charging device 7 which has a battery seat 71 for receiving the battery to be recharged and a charging indicator 72 formed thereon is disposed within the casing 11 and held therein by the holder 110. The charging device 7 is provided with an extension cord 8 connectable to an external power source (not shown in FIGS. 5–7). The cover member 121 has a first auxiliary holder mounted thereto in which a recess 112' is formed to receive and hold drilling tips and sockets (both not shown). The cover member 122 has a second auxiliary holder mounted thereto in which a recess is formed to receive and hold therein a flash light 10 which may also be powered by the battery set 9.

The cover member 121 is provided with a window 15 opposing the charging indicator 72 of the charging device 7 for a user monitoring the charging process.

It is apparent that although the invention has been described in connection with the preferred embodiments, it is contemplated that those skilled in the art may make changes to the preferred embodiments without departing from the scope of the invention as defined in the appended claims.

What is claimed is:

1. An electric hand drill set comprising a case having a casing closeable by cover means to define therein a first interior space and a second interior space, a hand drill being received and removably held within the first interior space, a power converting and supplying device being received and removably held within the second interior space, the power converting and supplying device comprising an extension cord adapted to connect to an external power source, the hand drill comprising a rechargeable battery set for powering the hand drill which is electrically connectable to and thus chargeable by the power converting and supplying device and the charging being indicated by a charging indicator, the cover means comprising a window formed thereon, opposing the charging indicator to allow user to monitor the charging of the battery set.

2. An electric hand drill set according to claim 1, wherein the cover means is opaque except for the window.

3. An electric hand drill set according to claim 2, wherein the indicator is located on the drill and is visible through the window when the drill is mounted in the case.

4. An electric hand drill set according to claim 2, wherein the rechargeable battery set is detachably connected to the drill, the power supplying and converting unit having means for receiving the battery set with the battery set detached from the drill and the power supplying and converting unit being mounted in the second interior space, the indicator being located on the power supplying and converting unit so as to oppose the window when the power supplying and converting unit is mounted in the case.

5. An electric hand drill set according to claim 1, wherein the indicator is located on the drill and is visible through the window when the drill is mounted in the case.

6. An electric hand drill set according to claim 1, wherein the casing includes a partition separating the first interior space from the second interior space, and the cover means includes a first cover member for closing the first interior space and a second cover member for closing the second interior space.

7. An electric hand drill set according to claim 6, wherein the first and second cover members are pivotally mounted to the casing.

8. An electric hand drill set according to claim 7, wherein the casing has a top end, a handle at the top end, and a bottom end opposite the top end, the second interior space being located at the bottom end, and the first interior space being located between the handle and the second interior space.

9. An electric hand drill set according to claim 8, wherein the first cover member is pivotally mounted to the casing along a vertical axis and the second cover member is pivotally mounted to the casing along a horizontal axis, the second interior space being disposed between the partition and the horizontal axis.

10. An electric hand drill set, comprising:

a case including a frame having an interior space;

two power drill members removably held at corresponding predetermined locations in the interior space, including

- a hand drill having a rechargeable battery set for powering the hand drill, and
- a power converting and supplying device, the power converting and supplying device being connectable to the rechargeable battery set and including an extension cord adapted to connect to an external power source; and a charging indicator disposed on one of the two power drill members;

wherein the case further includes cover means for closing the interior space, the cover means having a window opposing the charging indicator when the one of the two power drill members is held at its corresponding predetermined location, to allow a user to monitor the charging of the battery set, the cover means being opaque except in the window.

11. An electric hand drill set according to claim 10, wherein the cover means is pivotably mounted to the casing so that the interior space can be accessed to remove the hand drill and the power converting and supplying device from the interior space.

12. An electric hand drill set, comprising:

a case including a frame having a first interior space and a second interior space;

a hand drill removably held within the first interior space, the drill having a rechargeable battery set for powering the drill and a charging indicator for indicating whether the battery set is being charged; and a power converting and supplying device removably held within the second interior space, the power converting and supplying device being connectable to the rechargeable battery set and including an extension cord adapted to connect to an external power source;

wherein the case further includes cover means for closing the first and second interior spaces, the cover means having a window opposing the charging indicator to allow a user to monitor the charging of the battery set, the cover means being opaque except in the window.

13. An electric hand drill set according to claim 12, wherein the case includes a partition separating the first interior space from the second interior space, and the cover means includes a first cover member for closing the first interior space and a second cover member closing the second interior space.

14. An electric hand drill set according to claim 13, wherein the first and second cover members are pivotally mounted to the frame.

15. An electric hand drill set according to claim 14, wherein the frame has a top end, a handle at the top end, and a bottom end opposite the top end, the second interior space being located at the bottom end, and the first interior space being located between the handle and the second interior space.

16. An electric hand drill set according to claim 15, wherein the first cover member is pivotally mounted to the frame along a vertical axis and the second cover member is pivotally mounted to the frame along a horizontal axis, the second interior space being disposed between the partition and the horizontal axis.

17. An electric hand drill set, comprising:

a case including a frame having a first interior space, a second interior space below the first space, a partition separating the first and second spaces from each other, and an integrally molded handle above the first space;

a hand drill removably held at a predetermined position within the first interior space, the drill having a rechargeable battery set for powering the drill and a charging indicator for indicating whether the battery set is being charged; and a power converting and supplying device removably held within the second interior space, the power converting and supplying device being connectable to the rechargeable battery set and including an extension cord having a plug adapted to connect to a power source via an external plug-in type wall socket;

wherein the case further includes a first cover member, pivotally connected to the frame along a vertical axis, for closing the first interior space, the first cover member having a window opposing the charging indicator to allow a user to monitor the charging of the battery set when the drill in the predetermined position, the first cover member being opaque except in the window, and a second cover member, pivotally connected to the frame along a horizontal axis below the second space, for closing the second interior space.

* * * * *